United States Patent Office 3,234,126
Patented Feb. 8, 1966

3,234,126
SEPARATION OF WATER AND A SOLUTE CONCENTRATE FROM AN AQUEOUS SOLUTION
Herman S. Bloch, Skokie, Ill., assignor to Universal Oil Products Company, Des Plaines, Ill., a corporation of Delaware
No Drawing. Filed Dec. 31, 1962, Ser. No. 248,271
18 Claims. (Cl. 210—59)

This invention relates to a process for separating water from an aqueous solution by contacting the solution with a hydrate-forming resin, separating the resulting resin hydrate from a more concentrated aqueous raffinate and separately recovering deionized water from the hydrate to regenerate the hydrate-forming resin. The process thereby provides a means for increasing the solute concentration in the solution which may constitute the primary objective product of the process, or alternatively, provide a means for recovering solute-free water from the feed stock solution via the intermediate formation of the resin hydrate, separation of the hydrated resin from the solution and recovery of pure water from the resin hydrate.

One of the specific objectives of the process of this invention is to reduce the cost of recovering anhydrous solute from a dilute aqueous solution by removing a portion of the water from a given solution, thereby reducing the quantity of the water ultimately to be evaporated from the solution in the recovery of the anhydrous solute product, the present invention providing a method for effecting such initial dehydration by more economically operated means than evaporation, ion exchange, freezing, electrophoresis or by other conventional procedures.

In one of its embodiments this invention relates to a process for removing water from an aqueous solution which comprises mixing said solution at a relatively low datum temperature with an oxygen-containing organic resin having the property of reverse solubility and the capacity to form a water soluble hydrate at said datum temperature in the presence of said solution, thereafter, heating the solution formed at said datum temperature to an intermediate temperature more elevated than said datum temperature at which intermediate temperature a precipitate comprising partially hydrated resin is formed, separating said precipitate from a raffinate consisting of mother liquor containing a higher concentration of solute than the starting solution and separately heating the recovered precipitate to a higher elevated temperature at which last mentioned higher elevated temperature water separates from said intermediate precipitate to form regenerated resin and a separate water phase, and removing said water phase from the regenerated resin.

One of the principal and most useful adaptations of the present process for the removal of water from an aqueous solution is the recovery of substantially pure, ion-free water from a dilute aqueous solution (the more dilute the solution, the better) for the sake of the water component itself. This adaptation of the process provides a means of producing potable water at a stage in the growth of world population when the present sources of water are rapidly becoming inadequate and when new sources of supply are being actively sought in many countries of the world, not only for purposes of direct human and animal consumption, but also for irrigation purposes. Although sea water is readily available and may be pumped inland for substantial distances to the situs of available heating facilities and to supplies of electrical energy, the recovery of substantially ion-free, potable water from sea water presents a formidable cost problem because the initial requirement for separating water from its saline solutions via presently known methods such as distillation, freezing, dialysis, ion exchange, etc. consume such large quantities of heating and electrical utilities and involve such large outlays of capital equipment that the cost of potable water produced by such means from sea water generally exceeds 40¢ per thousand gallons, a cost level generally considered to be the upper limit of acceptance. Except for special uses of water which justify a cost exceeding such limit, the foregoing conventional procedures have been discounted as reasonably feasible means for the widespread production of water on a large scale. Although the present process involves the consumption of heat in the recovery of a potable, substantially solute-free water from an aqueous solution, the temperature swing from the datum to the maximum temperature levels in the process cycle is entirely sensible heat and the resulting net consumption of heat is much less than that required to provide latent heat of vaporization or latent heat of fusion, particularly when heat exchangers are incorporated into the present process cycle to enhance the recovery of heat from the aqueous effluent streams. The present method for the recovery of water from aqueous solutions is thus adapted to effect such recovery of a potable water product with only nominal consumption of heat and other utilities.

In another application of the present method for separating water from an aqueous solution, in which application the objective is not primarily the recovery of an ion-free water product, but rather, the recovery of a more highly concentrated aqueous solution as the ultimate product (e.g., a brine) or the recovery of the solute itself from the solution in a substantially anhydrous condition in conjunction with evaporative drying of the present aqueous raffinate solution, a substantial reduction in the cost of utilities, principally heating and pumping costs, is realized by combining the present water removal process with a final evaporation step.

The water recovery process of this invention is intrinsically associated with the provision of a resin capable of forming an ion-free hydrate from the water contained in the solution comprising the initial feed stock to the process, such as sea water, and the subsequent release of such water of hydration from the resin at a controllable stage of the process cycle after the removal from the hydrated resin from the mother liquor containing substantially all of the ions present in the initial feed stock solution, the mother liquor thereupon becoming the raffinate fraction of feed stock solution. The efficacy of the resin to form the hydrate and to release the water of hydration after separation from the mother liquor are therefore critical factors involved in the present process and the resin selected for use in the process must be capable of and have the properties requisite for such selective action. The resinous materials utilizable herein for this purpose are members of a group of materials having the property referred to in the chemical arts as "reverse solubility" and as such, contrary to the vast majority of both organic and inorganic compounds, decrease in solubility in a solvent as the temperature of the solution increases. The present resinous compositions are specific embodiments of the general class of materials possessing the property of reverse solubility, specifically and uniquely adapted to undergo such reversal of solubility upon the loss of its solubilizing water of hydration and furthermore, to exhibit this property in an aqueous solution of a solute other than the solubilized resin hydrate. Thus, the present resinous composition, herein referred to as the separating agent on the basis of its function in the process for separating water from an aqueous solution, is a substance which forms a soluble hydrate and is hydrated to its maximum degree at the lowest temperature existing in the process cycle (referred to herein as the "datum" temperature) and which is converted to a state of minimum hydration at the maximum temperature existing in the process cycle, at which latter temperature the resin undergoes "regeneration" to its initial, least hydrated form. These properties in general characterize a certain class of high molecular weight resinous compositions of both natural and synthetic origin containing multiple functional groups or radicals, a large proportion of which must of necessity be oxygen-bearing groups.

Since the separating agent, to be feasible in a process from which the product must necessarily be produced at a relatively low cost in order to be useful at all, must of necessity be capable of being repeatedly recycled in the process, an essential prerequisite of a resin for this purpose is its ability to undergo the temperature changes accompanying such recycling without substantial alteration in its physical structure or chemical composition; the present resinous compositions maintain their effectiveness through repeated cycles of the process and when heated to the maximum temperature provided in the cycle, the resin is restored to its least hydrated, regenerated form, suitable for recycling to the hydrate-forming stage of the cycle.

The terms: resin, plastic, polymer, etc. designate materials of the same general class of substances and may be used interchangeably to designate the present water-retaining, hydrate-forming separating agent of this invention. For sake of convenience the term "resin" will be used herein to refer generically to materials of resinous or plastic composition, as well as to polymers and colloids generally, the latter terms being used in specific instances to designate particular substances useful in the present process as separating agents. The term: resin, therefore, specifically applies herein to naturally occurring substances having the property of reverse solubility, useful as the present separating agents, including carragheen which is separated as a gelatinous extract of a seaweed (*Chondrus crispus*) and is also known as Irish moss, harvested from certain Atlantic coastal waters, such as the Atlantic waters off the shores of Ireland and the waters off the northeastern coast of the United States. Structurally, the material is a mixture of polysaccharides containing galactos, levulose and dextrose residues, as well as various pentosans. The fraction usable in the present separation process as the water-soluble resinous separating agent is the portion of crude carragheen soluble in cold water and is separated from the dried crude, harvested material by cold water extraction after the vegetable matter containing the carragheen has been shredded to release the cold water-soluble active component from the cellular structures.

Materials suitable for use as the present separating agent also include certain synthetic resinous and plastic materials generally containing a large proportion of oxygen-containing functional groups per unit of hydrocarbon residue in the structure of the resin, particularly hydroxyl groups which have the greatest water-solubilizing capacity of the various oxygen-containing radicals. Other oxygen-containing groups, including both polar and nonpolar radicals which may be present in the molecular composition of the resin include (in the general order of hydrate-forming ability and order of preference) such groups as carboxyl, carboxylate, nitro, sulfo, carboalkoxy, alkoxy and carbonyl, including both ketonic and aldehydic carbonyl. Resins which contain the aforementioned oxygen-bearing groups are generally water-soluble in cold water when the ratio of hydrocarbon units, selected from methyl ($—CH_3$), methylene ($—CH_2$), and methylidyne ($=CH—$), to oxygen-bearing groups does not exceed 6, and more preferably is within the range of from 2 to about 5, depending upon the activity of the oxygen-bearing group in contributing to the hydrate-forming capacity of the resin, as indicated in the foregoing general order of functional radical preference. Furthermore, when the hydrocarbon residue is of aromatic structure (considered generally to be relatively polar in comparison to other hydrocarbon types), the oxygen-containing radical associated therewith contributes greater solubilizing capacity to the resin than hydrocarbon residues of paraffinic or naphthenic structure.

Another characteristic of the resin which determines the usefulness of the material as a separating agent in the present process is its molecular weight. Effective resins for use in the present process have molecular weights within the range of from about 2,000 to about 25,000 and more preferably from about 2,500 to about 20,000. Although as a general proposition, molecular weight determines solubility of the material in cold water and the ability of the resin to precipitate from solution as the temperature of the latter is increased, other factors such as the identity, the number and the arrangement of functional groups as well as the internal structure of the resin (that is whether the monomers in the structure are cross-linked or bonded in an end-to-end arrangement) are also factors of substantial importance in determining the adaptability of the resin to its use in the present process.

Some of the resinous compositions which illustrate the types of materials suitable for use in the present process are described and more specifically characterized as follows: Polyvinyl alcohol or partially esterified polyvinyl alcohol formed by partial hydrolysis of polyvinyl alcohol esters, such as polyvinyl acetate etc. is a typical hydrate-forming resin which may be utilized as a separating agent in the present process when the proportion of ester groups hydrolyzed to hydroxyl radicals is sufficient to provide a resin hydrate soluble in cold water. Thus, vinyl acetate polymerized to a solid polymer having a molecular weight of from about 5,000 to about 30,000 by well-known polymerization techniques (such as, emulsion polymerization of vinyl acetate in the presence of a peroxide catalyst) and partially hydrolyzed to the extent of removing at least 10 percent and more preferably from 40 to 95 percent of the acetate ester linkages, is one of the preferred resinous compositions contemplated herein. Partial esters in which at least 60 percent of the ester linkages, up to about 95 percent, have been hydrolyzed to free hydroxyl groups are especially preferred.

Hydrolysis of polyvinyl acetate esters is effected by mixing the solid, water-insoluble polymer ester with from 2 to about 10 volumes of a liquid, anhydrous, organic solvent, such as methyl alcohol, acetone, methyl acetate, etc., thereafter maintaining the polymer in contact with the solvent for a period of time sufficient to cause the polymer to swell to a volume to at least double its initial volume, followed by mixing the swollen polymer with a hydrolyzing base or acid, such as dilute aqueous sodium hydroxide or hydrochloric acid, while maintaining the mixture at a temperature sufficient to reflux the solvent and for a period of contact therebetween sufficient to hydrolyze the desired proportion of acetate ester linkages to free hydroxyl groups. Typical mineral acids which are capable of hydrolyzing the organic ester linkages include, besides the aforementioned hydrochloric acid, such mineral acids as sulfuric and phosphoric acids or such organic acids as toluenesulfonic acid, methanesulfonic acid, and the like.

Mineral acids of at least 10 Normal concentration are mixed with the polyvinyl alcohol ester of an organic acid and heated to a temperature of from about 30 to about 100° C. or to the boiling point of the solvent utilized to swell the polyvinyl alcohol ester, for reaction periods up to several hours to obtain hydrolysis of up to 95 percent of the acetate or other organic acid ester linkages present in the starting material. In general, hydrolysis of the ester linkages in the polyvinyl alcohol ester is proportional to the concentration of mineral acid or alkali, the duration of the hydrolytic action and the temperature employed.

Other polyvinyl alcohol derivatives which are useful as the hydrate-forming separating agent in the present process are formed by intermediate hydrolysis of a polyvinyl alcohol ester resin (for example, by the aforementioned alkaline or mineral acid hydrolysis), followed by condensation of the free hydroxyl groups present in the recovered polyvinyl alcohol resin with ethylene oxide (in the presence of caustic) or with an aldehyde such as acetaldehyde, propionaldehyde, butyraldehyde, etc., the resulting aldehyde-polyol condensation (also in the presence of caustic) producing the so-called "acetals" which have the property of reverse solubility in aqueous solution. Thus, a hydrolyzed polyvinyl alcohol ester starting with an ester resin (for example, the acetate) having a molecular weight of from about 5,000 to about 20,000 and hydrolyzed to the extent that from 60 to 95 percent of the acetate ester linkages have been hydrolyzed to free hydroxyl groups, when mixed with a limited amount of an aldehyde, such as acetaldehyde, in the presence of a small amount of an alkaline catalyst, such as an aqueous potassium hydroxide solution, condenses to form the corresponding polyvinyl acetal which is soluble in cold water and forms a hydrate capable of reverse solubility.

Another class of synthetic resins which provides an effective hydrate-forming separating agent usable in the present process is the group of resins formed from cellulose as a base, including the partially esterified mineral acid esters, such as the nitrates, sulfates and phosphates prepared by reacting cellulose (e.g., cotton linters, wood flour, etc.) with the appropriate mineral acid in concentrated form or with the acid chloride at esterifying reaction conditions. The preferred resins of the esterified cellulose type have molecular weights of from about 5,000 to about 10,000. The water-soluble partial ethers of cellulose, such as the methyl alcohol ethers, also constitute effective separating agents. Also, products such as hydroxymethyl cellulose, hydroxyethyl cellulose and the sodium or potassium partial salts of the foregoing ethers, prepared by conventional procedures known in the prior art, constitute one of the preferred groups of cellulose derivatives useful in the present process. In addition, carboxymethyl cellulose and its alkali metal salts are suitable materials. Carboxymethyl cellulose is formed by reacting cellulose with an alkali metal hydroxide, such as concentrated caustic soda to swell the cellulose fibers and to form the alkali metal salt of the hydroxyl groups present in the molecular structure of the cellulose starting material. The resulting alkali metal salt is thereafter reacted with the sodium salt of chloroacetic acid to form the intermediate sodium carboxymethyl cellulose derivative containing up to about 1.3 sodium carboxymethyl groups per glucose unit. The resulting product is a useful hydrate-forming separating agent or the initial product may be further reacted with a mineral acid to hydrolyze some of the sodium salt linkages from the cellulose molecule by mixing the intermediate product with a dilute inorganic acid such as phosphoric acid to form the resulting carboxymethyl cellulose product.

The product formed by condensing cellulose with an alkylene oxide (in the presence of an alkaline catalyst, such as sodium hydroxide) is a polyoxyethylated cellulose which is soluble in cold water and has the desired property of reverse solubility enabling the resulting product to be used as a separating agent in the present process when the number of oxyethylene units per glucoside unit in the cellulose structure is at least 3, up to about 100. The preferred hydroxyethylated cellulose derivatives prepared by the foregoing procedure contain from about 10 to about 50 oxyethylene units per glucoside unit in the structure of the resulting water-soluble condensation product.

The foregoing constitute a partial listing of usable resins in the generic group of substances containing oxygen-bearing, hydrophilic radicals which have the property of reverse solubility; other types, although not necessarily of the same degree of effectiveness, include such materials as the esters, salts, amides, or other derivatives of polyacrylic and polymethacrylic acid, polyoxyalkylated polyhydric alcohols such as inositol, trimethylol methanol, trimethylol ethanol, glycerol, etc. containing from 4 to about 50 oxyalkylene units per molecule of alcohol; in which the oxyalkylene unit is selected from oxyethylene, oxypropylene, oxybutylene, etc., including mixtures of these. These materials are formed by condensing the polyhydric alcohol starting material with an oxyalkylating agent such as ethylene oxide, propylene oxide, butylene oxide, styrene oxide, an ethylene halohydrin such as ethylene chlorohydrin, etc. in the presence of caustic and continuing the condensation as additional oxyalkylating agent is introduced into the reaction mixture, until the product contains the desired proportion of oxyalkylene units. These products may be completely soluble in cold water or may form colloidal dispersions or sols which for purposes of classification and description herein are classed as water-soluble resins or macromolecules. Another class of resin-like substances which may be used as the source of the hydrate-forming separating agent herein are water-soluble species of the so-called alkyds formed by intercondensation of the aforementioned polyhydric alcohols with polybasic, carboxylic acids which may contain unsaturated (e.g., olefinic) bonds as sites of polymerization, typified by such organic acids as malonic acid, maleic acid, succinic acid, adipic acid, fumaric acid, itaconic acid, acrylic acid, trimesic acid, hemimellitic acid, oleic acid, linoleic acid and linolenic acid, etc., reacted at conditions sufficient to form polymers having molecular weights of from about 2,000 to 20,000. The latter condensation products containing one or more ester linkages formed by condensation of one or more hydroxyl groups of the polyhydric alcohol with one or more carboxyl groups of the organic acid contain free hydroxyl and free carboxyl groups (depending upon the functionality of the starting materials) which have active hydrogen atoms subject to oxyalkylation via condensation with an oxyalkylating agent, such as ethylene oxide, ethylene chlorohydrin, propylene oxide, a polyalkylene glycol chlorohydrin such as that of triethylene glycol and generally in the presence of an alkali metal hydroxide, such as caustic soda to form another group of especially effective hydrate-forming water-soluble resins capable of undergoing reverse solubility in accordance wth the present process.

In the process of utilizing the aforementioned hydrate-forming resins, the feed stock solution, which may contain various concentrations of dissolved solute of organic or inorganic character, depending upon the objectives of the present separation process (i.e., whether the desired product is an aqueous solution of higher solute concentration or a substantially pure deionized water product), at the lowest temperature usable in the process (the present so-called "datum" temperature) is mixed with up to about 200 to 300, and more preferably with from 10 to about 50 percent by weight of the cold water-soluble resin to form a substantially homogeneous solution of fully hydrated resin in a solute-enriched aqueous medium. Thereafter, the solution is heated to an elevated intermediate temperature, generally from 10° to 40° C. above the datum temperature, or in any event to the temperature at which maximum separation or precipitation of resin partial hydrate occurs, the precipitated partial hydrate filtered or otherwise separated (e.g., by centrifugation, settling, etc.) from the remaining aqueous mother liquor which consists of an aqueous concentrate of the solute, and the recovered precipitate of the resin hydrate separately heated to a temperature representing the maximum elevated temperature utilized in the process cycle, up to within 10° C. of the softening point of the resin at which maximum temperature the deionized water product separates from the solid phase and reconstitutes the resin to its regenerated minimum water content suitable for recycling to the initial hydrate-forming stage of the process cycle. In some instances the resin has a sufficiently elevated melting point that the recovery of the water of hydration from the resin hydrate may be effected at the boiling point of water (which may be raised substantially above 100° C. by maintaining the system at a superatmospheric pressure, up to 10 or more atmospheres). On the other hand, other resins melt at temperatures below the boiling point of water; consequently, a lower temperature short of the melting point is the maximum elevated temperature utilizable herein.

The aqueous concentrate separated from the partially hydrated resin may be again contacted with additional dehydrated resin, if desired, to form an additional yield of water product or to reduce the water content of the concentrate further, although reduction of the water content of the feed stock solution by more than about 15 percent by weight of its initial water content is generally impractical because the quantity of water required to flush the residual, surface-retained solution from the hydrated resin precipitate increases to an excessive degree. Furthermore, as the solute concentration in the aqueous phase contacted with the dehydrated resin increases, the weight of resin per unit of feed stock required to provide a net yield of water product also increases; that is, the efficiency of water recovery decreases as the solute concentration in the feed stock solution increases. In other instances (for example, in the recovery of water from an aqueous solution of an organic solvent, such as the recovery of a glycol concentrate from a dilute aqueous solution of the glycol) the resin becomes soluble in the organic solvent as the water is removed from the solution and the latter factor determines the maximum limit of dehydrating the solution. In still other instances, representing problems which may arise in connection with certain types of solutes having limited solubility in water, the solute crystallizes or precipitates by other means from solution as the water component of the feed stock is withdrawn therefrom; the limit of maximum solute yield per cycle is accordingly determined by the maximum solubility of the solute.

The process of this invention is effected by any suitable means whereby a mass of solid, dehydrated resin particles is contacted with the feed stock solution at the datum temperature, resulting in the formation of a homogeneous solution of the resin, heating the resulting solution to the intermediate elevated temperature provided herein at which temperature a resin hydrate precipitates, recovering the precipitate and separately heating the latter to the maximum elevated temperature provided in the present process and separately recovering a resulting dehydrated resin from relatively pure water produced by the dehydration of the resin hydrate, particularly if the partially hydrated resin precipitated at the intermediate temperature is washed to free adherent solute from the resin hydrates precipitate before the latter is heated to the present maximum temperature to recover its water of hydration. The three-step operation may be carried out in a series of separate towers or beds of the resin, the feed stock solution and the fluid utilized as a heat transfer medium contacted with the resin flowing countercurrent to the resin in an arrangement which enables maximum recovery of heat from the countercurrent streams.

Although any fluid in which the resin is substantially insoluble at the intermediate and maximum elevated temperatures utilized in the present process may be utilized as heat transfer medium for the purpose of carrying heat into the resin-precipitating and resin-dehydrating (regeneration) stages, water which has a relatively high specific heat and specific conductivity constitutes one of the preferred fluids for this use, since the water released from the resin hydrate as a result of the reverse solubility effect joins directly with the heat transfer fluid and thereby, in effect, not only produces one of the desired products of the process with which it is per se compatible but reconstitutes the heat transfer medium most efficiently. Air, or more preferably, an inert gas such as nitrogen, carbon dioxide, etc. is also usable herein as heat transfer medium, particularly if the resin is to be dried between the separate stages of the operation. Another class of fluids useful as a heat transfer medium is the group referred to as the normally liquid hydrocarbons such as butane, n-pentane, n-hexane, cyclohexane, dodecane, etc. which do not dissolve the resin. The water released as the temperature is increased forms an upper layer in the effluent receiver from which the heat transfer fluid and water may be separately withdrawn for recovery and recycle.

The present invention is further illustrated with respect to several of its specific embodiments in the following examples, which are presented for illustrative purposes without intending to limit the scope of the invention necessarily to the embodiments set forth.

EXAMPLE I

A process for separating a deionized water product containing not more than 200 p.p.m. of dissolved solids is described in the following runs, utilizing as starting material sea water containing about 3.3 percent by weight of dissolved solids, mostly sodium chloride. The sea water is supplied into the process at a temperature of about 8° C. and mixed at this temperature with the hydrate-forming resin to form a homogeneous solution (or colloidal dispersion) of the resin in sea water. In the following runs which were designed to determine the efficacy in the process of several resins (one of which is the natural products: carragheen, another type being one of a series of synthetic materials comprising partially hydrolyzed polyvinyl acetates and still another type is oxyethylated cellulose), the resins are dissolved in the sea water at the inlet temperature of the latter solution utilizing various resin to feed stock ratios, the resulting solutions are heated to an intermediate elevated temperature at which maximum precipitation of resin hydrate occurs (the temperature varying with the type of resin, the concentration of resin in solution and the rate of heating), followed by filtering the resulting precipitate from a raffinate consisting of a more concentrated aqueous solution of the salts present in the sea water feed stock, transferring the hydrated resin (a loose, friable solid) filtered from the raffinate into a vertical column and thereafter charging a stream of deionized water, first at the intermediate elevated temperature, then at 95–98° C. The water flowing into the top of the column, downwardly through the mass of resin hydrate particles raises the temperature of the resin gradually as heat exchange takes place between the resin and hot water. The effluent stream from the bottom of the column is diverted into a separate receiver vessel until the salt content of the wash effluent is reduced to 350 p.p.m. and is then separately collected as product. Initially, the wash stream removes residual raffinate solution from the surface of the resin particles and thereafter, dehydrates the resin hydrate as the latter is heated and approaches 90° C. the hot effluent stream is collected in a product receiver until the effluent stream reaches a temperature of 90° C., at which temperature a major proportion of the resin has undergone maximum dehydration or "regeneration" (the average water content of resin at this temperature is 0.9 percent by weight). Sea water is then charged into the dehydrated resin and as the temperature of the resin at the inlet of the column is reduced, the resin redissolves in the feed stock solution, the resin particles in the bed undergoing heat exchange with the cold inlet stream as the sea water advances through the bed. As the effluent stream drops in temperature, resin begins to appear in solution and thereafter the effluent is separately collected in the vessel in which intermediate precipitation of the resin is effected. On the basis of trial pre-runs, maximum precipitation of the resin hydrate intermediate is obtained at temperatures of from about 35 to 40° C.; accordingly, 40° C. is set as the intermediate temperature at which maximum precipitation of resin hydrate is obtained utilizing the following resins.

By heat exchanging the various influent streams with effluent products, a net conservation of the heating and cooling load of about 28 percent of the utilities required without such heat exchange is effected. Product yields and data relating to other operating variables for a variety of resins are set forth in the following Table I:

Table I
RECOVERY OF ION-FREE WATER FROM SEA WATER ACCOMPANYING REVERSE SOLUBILITY OF RESINS

| Resin | Sea water to resin ratio, wt./wt. | Water content in percent of resin [2] at intermediate T. | Yield [3] of water, percent |
|---|---|---|---|
| Carragheen moss [1] | 20 | 12 | 0.6 |
|  | 10 | 11.5 | 1.15 |
|  | 5 | 10 | 2.0 |
|  | 2.5 | 8 | 3.2 |
|  | 2 | 7.3 | 3.7 |
|  | 1 | 5.5 | 5.5 |
| PVA-100 [4] | 10 | Nil | Nil |
| Hydrolyzed PVA-90 [5] | 10 | 1.5 | 1 |
| Hydrolyzed PVA [6] | 10 | 10 | 1.3 |
|  | 5 | 6.5 | 2.0 |
|  | 2 | 3.9 | 5.7 |
|  | .5 | 2.8 | 1.1 |
| Hydrolyzed PVA-30 [7] | 10 | 10.8 | 1.4 |
|  | 5 | 7.1 | 2.4 |
|  | 2 | 4.8 | 6.2 |
|  | 0.5 | 3.1 | 1.3 |
| Hydrolyzed PVA-10 [8] | 10 | 12.5 | 2.2 |
|  | 5 | 11.2 | 4.9 |
|  | 2 | 9.8 | 9.8 |
|  | 0.5 | 4.9 | 0.8 |
| Oxyethylated cellulose [9] | 10 | 8.4 | 1.3 |
|  | 5 | 6.8 | 2.3 |
|  | 2 | 4.6 | 5.6 |
|  | 0.5 | 2.8 | 1.2 |
| Oxyethylated cellulose [10] | 10 | 12 | 2.7 |
|  | 5 | 11.5 | 5.1 |
|  | 2 | 10.1 | 15.6 |
|  | 0.5 | 7.8 |  |

[1] Cold water soluble fraction of Irish Moss, containing less than 0.5 percent by weight water.
[2] Wt. of intermediate hydrate at 40° C. less wt. of dehydrated resin initially used in process divided by initial wt. of resin/100.
[3] The yield is measured directly as the increase in wt. of effluent from resin dehydration step (i.e., the hot, deionized water effluent) per cycle/wt. of sea water per cycle×100. Measured as effluent overhead of dehydration stage, after solids content of overhead is reduced to 350 p.p.m. Solids content of effluent, mixed average: 180 p.p.m.
[4] Polyvinylacetate, M.W.: about 22,000; no free hydroxyl group.
[5] Partially hydrolyzed polyvinylacetate, M.W.: about 22,000; 50 percent of acetyl groups hydrolyzed to hydroxyl.
[6] Polyvinyl acetate, M.W.: about 22,000, of which about 50 percent of the acetate ester group are hydrolyzed to free hydroxyl radicals.
[7] Polyvinyl acetate, M.W.: about 22,000, 70 percent of acetate ester hydrolyzed to hydroxyl.
[8] Polyvinyl acetate, M.W.: about 22,000, 90 percent of acetate ester hydrolyzed to hydroxyl.
[9] Cotton linters reacted with ethylene oxide in the presence of caustic; 45 EO/glucoside.
[10] Cellulose ethoxylated to contain 60 EO/glucoside.

The foregoing data demonstrate the necessity of free polar radicals in the structure of the resin; completely esterified polyvinylacetate is relatively insoluble in water and has substantially no hydrate-forming or water-retentive capacity.

I claim as my invention:

1. A process for removing water from an aqueous feed solution which comprises mixing said solution at a relatively low datum temperature with an organic resin which is soluble in the feed solution at said low datum temperature, said resin having a large proportion of oxygen-containing functional groups and also having the property of reverse solubility and the capacity to form a water-soluble hydrate at said datum temperature in the presence of said solution, thereafter heating the solution to an intermediate temperature more elevated than said datum temperature to precipitate said resin as a hydrate, separating said precipitate from a raffinate now containing a higher concentration of solute than said feed solution heating the resin precipitate above the intermediate temperature to drive off the water of hydration therefrom and regenerate said resin, and removing said water of hydration from the regenerated resin.

2. The process of claim 1 further characterized in that said resin is the cold water-soluble fraction carragheen.

3. The process of claim 1 further characterized in that said resin is an organic material having a molecular weight of from about 2,000 to about 25,000 and contains from about 2 to about 5 oxygen-bearing polar radicals selected from the group consisting of hydroxyl, carboxyl, carboxylate, nitro, sulfo, carbalkoxy, alkoxy, and carbonyl for each hydrocarbon unit in the structure of the resin, selected from the group consisting of methyl, methylene and methylidyne.

4. The process of claim 1 further characterized in that said resin is a cold water-soluble, partially hydrolyzed organic acid ester of polyvinyl alcohol.

5. The process of claim 4 further characterized in that said organic acid is acetic acid.

6. The process of claim 4 further characterized in that at least 10 percent of the ester linkages of the resin are hydrolyzed to hydroxyl groups.

7. The process of claim 6 further characterized in that from 40 to 95 percent of said ester groups are hydrolyzed to hydroxyl radicals.

8. The process of claim 1 further characterized in that said resin is an alki metal derivative of carboxymethyl cellulose.

9. The process of claim 1 further characterized in that said resin is a hydroxyethylated cellulose containing at least 10 oxyalkylene units per glucoside unit in the cellulose structure.

10. The process of claim 9 further characterized in that said oxyethylated cellulose contains from 20 to about 100 oxyethylene units per glucoside unit in the structure of cellulose.

11. The process of claim 1 further characterized in that said resin is methylcellulose.

12. The process of claim 1 further characterized in that said resin is a polyoxyalkylated polyhydric alcohol selected from the group consisting of inositol, trimethylol methane, and glycerol and said oxyalkylating agent is selected from the group consisting of ethylene oxide, an ethylene halohydrin, propylene oxide, butylene oxide, and styrene oxide.

13. The process of claim 1 further characterized in that said datum temperature is within the range of from about 2° to about 40° C.

14. The process of claim 12 further characterized in that said datum temperature is from about 8° to about 15° C.

15. The process of claim 1 further characterized in that said intermediate elevated temperature is from about 10° to about 40° C. above said datum temperature.

16. The process of claim 1 further characterized in that said intermediate elevated temperature is less than said higher elevated temperature and corresponds to the temperature at which the resin hydrate is least soluble in the solution.

17. The process of claim 1 further characterized in that said hydrated resin precipitated at said intermediate temperature is heated to said higher elevated temperature by contact with water supplied at said higher elevated temperature.

18. The process of claim 1 further characterized in that said aqueous solution is sea water.

References Cited by the Examiner

Hercules I, Ethyl Cellulose, Properties and Uses, copyright 1949 by Hercules Powder Co., 59 pages, pages 4–9.
Hercules II, Cellulose Gum, copyright 1949 by Hercules Power Co., 11 pages, pages 3 and 9.
Kunin, Elements of Ion Exchange, copyright 1960 by Reinhold Publ. Co., N.Y., pages 61–62 relied upon.
Report No. 27, Saline Water Conversion, Advance in Chemistry Series, copyright 1960, American Chemical Society, Wash., D.C., page 42.
Whistler et al., Polysaccharide Chemistry, copyright 1953, by Academic Press, Inc., 125 E. 23rd St., New York, N.Y., pages 216—228.

MORRIS O. WOLK, *Primary Examiner.*